(12) United States Patent
Fujii

(10) Patent No.: US 10,248,383 B2
(45) Date of Patent: Apr. 2, 2019

(54) DIALOGUE HISTORIES TO ESTIMATE USER INTENTION FOR UPDATING DISPLAY INFORMATION

(71) Applicant: KABUSHIKI KAISHA TOSHIBA, Minato-ku, Tokyo (JP)

(72) Inventor: Hiroko Fujii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/672,993

(22) Filed: Aug. 9, 2017

(65) Prior Publication Data

US 2017/0337036 A1 Nov. 23, 2017

Related U.S. Application Data

(63) Continuation of application No. PCT/JP2015/057359, filed on Mar. 12, 2015.

(51) Int. Cl.
*G10L 15/22* (2006.01)
*G06F 3/0482* (2013.01)
(Continued)

(52) U.S. Cl.
CPC ............ *G06F 3/167* (2013.01); *G06F 3/048* (2013.01); *G06F 3/0482* (2013.01);
(Continued)

(58) Field of Classification Search
CPC ............ G10L 15/22; G10L 2015/221; G10L 2015/223; G10L 2015/228; G10L 15/265; G06F 17/27; G06F 17/2715; G06F 3/0482
(Continued)

(56) References Cited

U.S. PATENT DOCUMENTS 5,357,596 A * 10/1994 Takebayashi ............. G06F 3/16
704/251
8,171,431 B2 * 5/2012 Grossman ........... G06F 3/04883
345/156

(Continued)

FOREIGN PATENT DOCUMENTS

JP   H05-120350 A   5/1993
JP   H08-063319 A   3/1996
(Continued)

OTHER PUBLICATIONS

International Search Report dated Apr. 21, 2015 in PCT Application No. PCT/JP2015/057359, 1 pg.

*Primary Examiner* — Martin Lerner
(74) *Attorney, Agent, or Firm* — Knobbe, Martens, Olson & Bear, LLP

(57) ABSTRACT

According to one embodiment, a dialogue support apparatus includes a processing circuitry. The processing circuitry receives input information indicating a user's intention. The processing circuitry determines at least one target dialogue state among dialogue histories related to dialogue states indicating dialogue results between a user and a dialogue system which estimates the user's intention and performs processing in accordance with the user's intention, the target dialogue state being a target of instructions from the user. The processing circuitry acquires a processing result from the dialogue system by inputting the input information and the target dialogue state into the dialogue system. The processing circuitry generates first update information to update a display of the processing result.

18 Claims, 10 Drawing Sheets

(51) Int. Cl.
  *G06F 3/16*   (2006.01)
  *G06F 3/048*  (2013.01)
  *G06F 17/27*  (2006.01)
  *G10L 15/26*  (2006.01)
  *G06F 17/30*  (2006.01)

(52) U.S. Cl.
  CPC ...... *G06F 17/279* (2013.01); *G06F 17/30654* (2013.01); *G10L 15/26* (2013.01)

(58) Field of Classification Search
  USPC ................ 704/270, 275; 707/721, 751, 768
  See application file for complete search history.

(56) References Cited

U.S. PATENT DOCUMENTS

| | | | | |
|---|---|---|---|---|
| 8,488,178 | B2* | 7/2013 | Fukata | G06F 3/048 348/333.05 |
| 9,154,703 | B2* | 10/2015 | Koda | G06F 17/30038 |
| 9,214,156 | B2* | 12/2015 | Gandrabur | G10L 15/1822 |
| 9,875,494 | B2* | 1/2018 | Kalns | G06Q 30/06 |
| 2002/0173965 | A1* | 11/2002 | Curry | G06F 17/289 704/275 |
| 2003/0009330 | A1 | 1/2003 | Cho | |
| 2005/0209856 | A1* | 9/2005 | Kii | G06Q 10/02 704/270.1 |
| 2007/0112759 | A1* | 5/2007 | Kulakow | G06F 17/30646 |
| 2008/0201135 | A1* | 8/2008 | Yano | G10L 15/1822 704/231 |
| 2008/0215338 | A1* | 9/2008 | Mizutani | G10L 15/22 704/277 |
| 2009/0094560 | A1* | 4/2009 | Grossman | G06F 3/04883 715/863 |
| 2009/0141871 | A1* | 6/2009 | Horioka | G10L 15/22 379/88.04 |
| 2010/0201879 | A1* | 8/2010 | VanDuyn | H04N 5/45 348/565 |
| 2011/0258543 | A1 | 10/2011 | Larsson et al. | |
| 2012/0072870 | A1* | 3/2012 | Akifusa | G06F 3/0482 715/830 |
| 2012/0253789 | A1* | 10/2012 | Heck | G10L 15/1822 704/9 |
| 2014/0071323 | A1* | 3/2014 | Yi | G06F 3/04883 348/333.01 |
| 2014/0156277 | A1* | 6/2014 | Fujii | G10L 15/26 704/251 |
| 2014/0156279 | A1 | 6/2014 | Okamoto et al. | |
| 2014/0303975 | A1 | 10/2014 | Ohmura et al. | |
| 2015/0039307 | A1* | 2/2015 | Jeon | G10L 15/26 704/235 |
| 2015/0371664 | A1* | 12/2015 | Bar-or | G10L 25/48 704/270.1 |
| 2017/0103757 | A1* | 4/2017 | Yamamoto | G10L 15/22 |
| 2017/0110127 | A1* | 4/2017 | Fujii | G10L 15/22 |
| 2017/0148441 | A1* | 5/2017 | Fujii | G10L 15/10 |

FOREIGN PATENT DOCUMENTS

| | | |
|---|---|---|
| JP | 2001-022779 A | 1/2001 |
| JP | 2003-076389 A | 3/2003 |
| JP | 2014-038150 A | 2/2014 |
| JP | 2014-109889 A | 6/2014 |
| JP | 2014-203208 A | 10/2014 |

* cited by examiner

| 301 | 302 | 303 | 304 | 305 | 306 |
|---|---|---|---|---|---|
| Dialogue state identifier | Dialogue sequence identifier | Dialogue state name | Display status flag | Time | System response data |
| 1 | 1 | Search_spot(Kyoto) | 0 | 2014/07/07 12:05:11 | |
| 2 | 1 | Search_spot(Arashiyama) | 1 | 2014/07/07 12:05:45 | |
| 3 | 2 | Search_spot(Izu) | 2 | 2014/07/07 12:06:20 | |
| 4 | 2 | Search_spot(Izu Kogen) | 1 | 2014/07/07 12:06:53 | |
| ⋮ | ⋮ | ⋮ | ⋮ | ⋮ | ⋮ |
F I G. 3
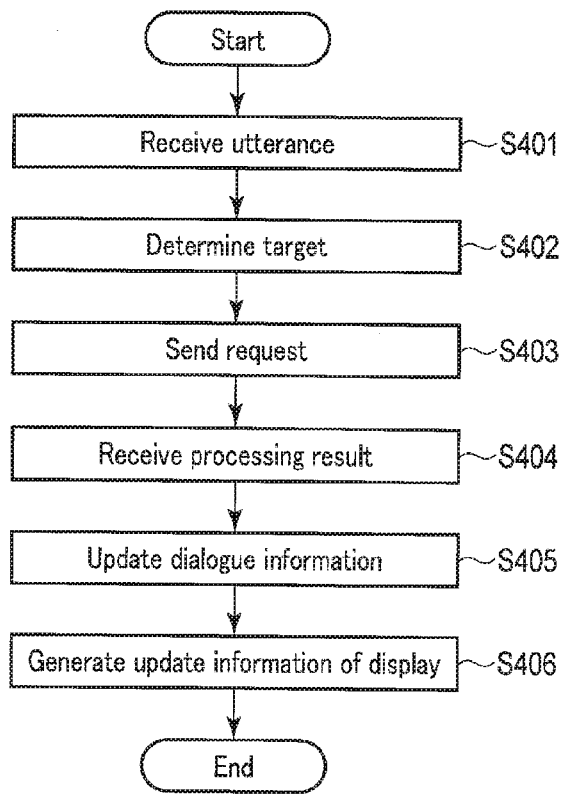
F I G. 4

| Dialogue state identifier 301 | Dialogue sequence identifier 302 | Dialogue state name 303 | Display status flag 304 | Time 305 | System response data 306 |
|---|---|---|---|---|---|
| 1 | 1 | Search_spot(Kyoto) | 0 | 2014/07/07 12:05:11 | |
| 2 | 1 | Search_spot(Arashiyama) | 0 | 2014/07/07 12:05:45 | |
| 3 | 2 | Search_spot(Izu) | 0 | 2014/07/07 12:06:20 | |
| 4 | 2 | Search_spot(Izu Kogen) | 0 | 2014/07/07 12:06:53 | |
| 5 | 1 | Search_hotel(Arashiyama) | 1 | 2014/07/07 12:07:50 | |
| 6 | 2 | Search_hotel(Izu Kogen) | 1 | 2014/07/07 12:07:50 | |

```
             U10: I want to schedule a recording
  Order of   S10: When is the program broadcast?
  utterance  U11: July 10th
             S11: From what time does it start?
             U12: From 21:00
             S12: What is the broadcast channel?
             U13: Channel XX
             S13: What is the program title ?
             U14: Change the broadcast date to July 11th
             S14: From what time does it start?
                  ...
```

| Dialogue state identifier 301 | Dialogue sequence identifier 302 | Dialogue state name 303 | Display status flag 304 | Time 305 | System response data 306 |
|---|---|---|---|---|---|
| 10 | 5 | Record_TV() | 0 | 2014/07/07 12:05:00 | | 307
| 11 | 5 | Record_TV (date: July 10) | 0 | 2014/07/07 12:05:11 | |
| 12 | 5 | Record_TV (date: July 10/stime: 21:00) | 0 | 2014/07/07 12:05:45 | |
| 13 | 5 | Record_TV (date: July 10/stime: 21:00 /channel: Channel XX) | 1 | 2014/07/07 12:06:20 | |
F I G. 15
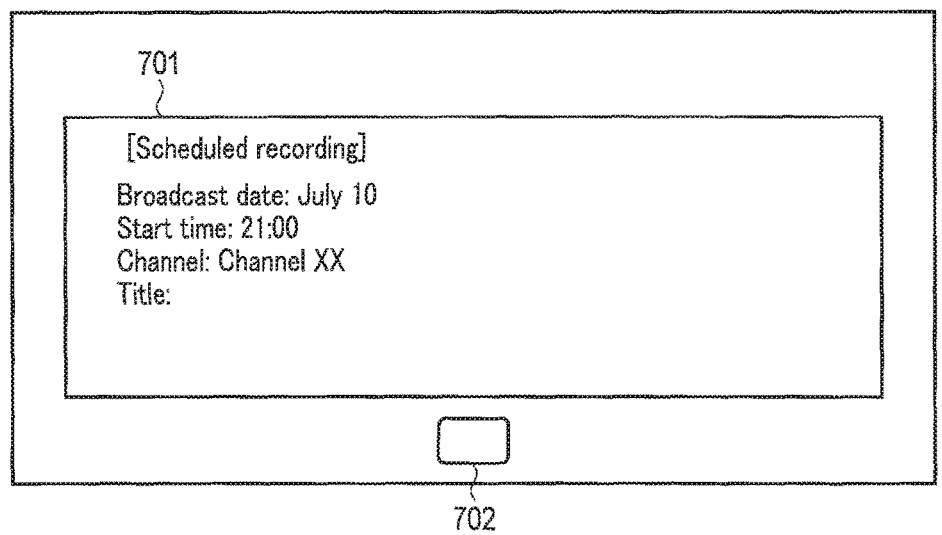
F I G. 16

| Dialogue state identifier 301 | Dialogue sequence identifier 302 | Dialogue state name 303 | Display status flag 304 | Time 305 | System response data 306 |
|---|---|---|---|---|---|
| 10 | 5 | Record_TV() | 0 | 2014/07/07 12:05:00 | |
| 11 | 5 | Record_TV (date:July 10) | 0 | 2014/07/07 12:05:11 | |
| 12 | 5 | Record_TV (date:July 10/stime:21:00) | 0 | 2014/07/07 12:05:45 | |
| 13 | 5 | Record_TV (date:July 10/stime:21:00 /carrier:Channel XX) | 0 | 2014/07/07 12:06:20 | |
| 14 | 6a | Record_TV (date:July 11) | 1 | 2014/07/07 12:06:53 | | 1701
| 15 | 6b | Record_TV (date:July 11/stime:21:00 /carrier:Channel XX) | 3 | 2014/07/07 12:06:53 | | 1702
F I G. 17
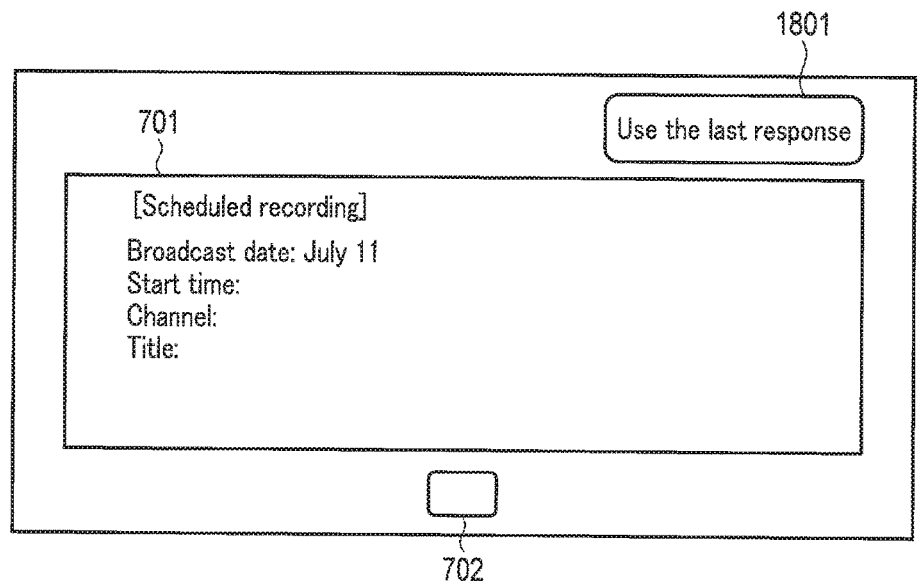
F I G. 18

DIALOGUE HISTORIES TO ESTIMATE USER INTENTION FOR UPDATING DISPLAY INFORMATION

CROSS-REFERENCE TO RELATED APPLICATIONS

This application is a Continuation Application of PCT Application No. PCT/JP2015/057359, filed Mar. 12, 2015, the entire contents of which are incorporated herein by reference.

FIELD

Embodiments described herein relate generally to a dialogue support apparatus, method and terminal.

BACKGROUND

In recent years, small mobile terminals, such as smartphones, are in widespread use, and in accordance therewith dialogue systems allowing natural speech inputs have received attention. The dialogue systems allowing natural speech inputs interpret a user's intention without the need for users to adapt their speech to the systems; thus, users do not have to use predefined phrases, and they can give instructions to the system with natural expressions. In such dialogue systems, if conditions for a search performed during a past dialogue are changed to perform a new search, it is necessary to undo a dialogue.

To undo a dialogue, there is a method of selecting a dialogue state to be applied depending on whether or not the search conditions are exclusive, without a need for a user to say "undo".

BRIEF DESCRIPTION OF THE DRAWINGS

FIG. 3 is a drawing showing an example of a dialogue information table stored in a dialogue information storage.

FIG. 4 is a flowchart showing the operation of the dialogue support apparatus when receiving a user's utterance.

FIG. 15 is a drawing showing a dialogue information table to which dialogue information related to a user's utterance U13 is added.

FIG. 16 is a drawing showing a display example of a processing result of a user's utterance U13.

FIG. 17 is a drawing showing a dialogue information table to which dialogue information related to a user's utterance U14 is added.

FIG. 18 is a drawing showing an example of a user interface according to the second embodiment.

DETAILED DESCRIPTION

However, with the aforementioned procedure, a latest user's utterance is always applied to one dialogue state. Accordingly, users need to input almost the same conditions many times when comparing and evaluating items, such as trips and clothing at an online store on the Internet, for example, and it is inconvenient for users.

In general, according to one embodiment, a dialogue support apparatus includes a processing circuitry. The processing circuitry receives input information indicating a user's intention. The processing circuitry determines at least one target dialogue state among dialogue histories related to dialogue states indicating dialogue results between a user and a dialogue system which estimates the user's intention and performs processing in accordance with the user's intention, the target dialogue state being a target of instructions from the user. The processing circuitry acquires a processing result from the dialogue system by inputting the input information and the target dialogue state into the dialogue system. The processing circuitry generates first update information to update a display of the processing result.

Hereinafter, a dialogue support apparatus, method, program and terminal according to the present embodiment will be described in detail with reference to the accompanying drawings. In the embodiments described below, elements assigned with the same reference symbols perform the same operations, and redundant descriptions such elements will be omitted as appropriate.

(First Embodiment)

An example of a dialogue system on which the embodiment is based will be explained with reference to the conceptual diagram shown in FIG. 1.

Figure 1:
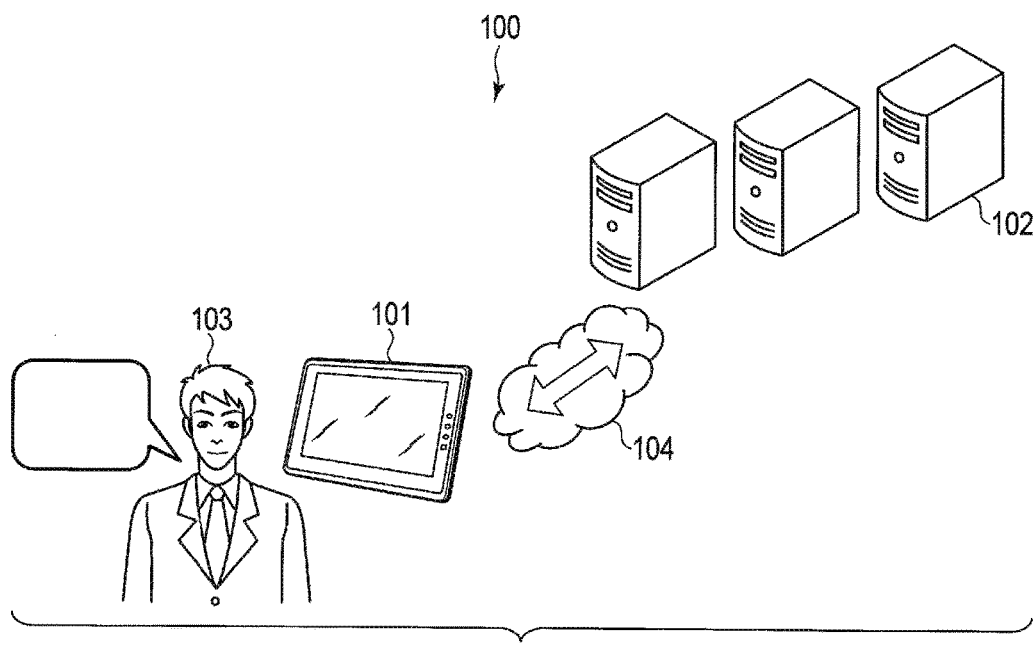
FIG. 1 is a conceptual diagram showing an example of a dialogue system on which an embodiment is based.

A dialogue system 100 shown in FIG. 1 includes a terminal 101 and a dialogue processing server 102. The terminal 101 is a mobile terminal such as a tablet computer or a smartphone used by a user 103, for example. In the present embodiment, it is assumed that the user 103 inputs speech to a client application installed onto the terminal 101 and speech recognition is performed to acquire a speech recognition result; however, similar processing can be performed for a case of text input. The terminal 101 sends the speech recognition result to the dialogue processing server 102.

The dialogue processing server 102 is connected to the terminal 101 via network 104, and receives the speech recognition result from the terminal 101. The dialogue processing server 102 operates as a dialogue system, which estimates the user's intention from the speech recognition result, performs processing in accordance with the intention, and performs dialogue processing of the speech recognition result. The dialogue processing server 102 sends a processing result of the dialogue processing to the terminal 101.

Figure 2:
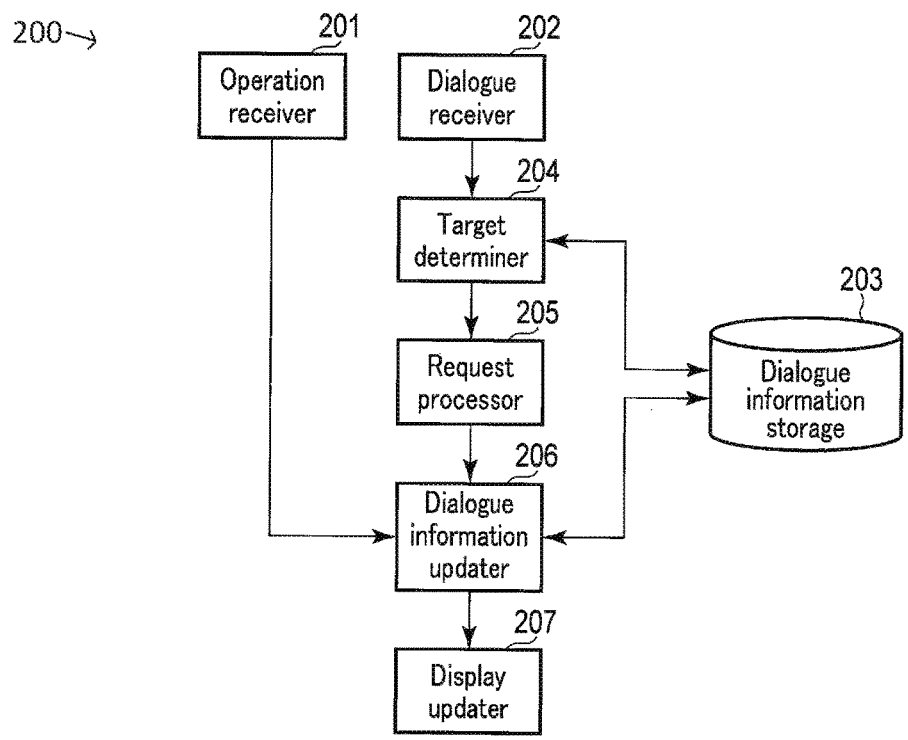
FIG. 2 is a block diagram of a dialogue support apparatus according to the first embodiment.

Next, the dialogue support apparatus according to the present embodiment will be described with reference to the block diagram shown in FIG. 2.

The dialogue support apparatus 200 according to the present embodiment includes an operation receiver 201 (a second receiver), a dialogue receiver 202 (a first receiver), a dialogue information storage 203, a target determiner 204, a request processor 205, a dialogue information updater 206, and a display updater 207.

In FIG. 1, the dialogue support apparatus 200 according to the present embodiment may be included in the dialogue processing server 102, or in a server different from the dialogue processing server 102. If the dialogue support apparatus 200 is included in the dialogue processing server 102 or in a different server, the terminal 101 should include a speech acquisition unit, such as a microphone, a display unit which displays a user interface, and a communication unit which performs data communication. Furthermore, the dialogue support apparatus 200 may be included in the terminal 101.

The operation receiver 201 receives a user's operation of the screen, and acquires an operation target and operation detail. As the process of acquiring the operation target and the operation detail, processing on a user interface which is common in a tablet device may be adopted, and a detailed description of such processing is therefore omitted herein.

The dialogue receiver 202 receives a user's utterance as an audio signal, performs speech recognition on the audio signal, and receives text of the speech recognition result as input information indicating a user's intention. For example, a user's utterance input to a microphone installed onto the terminal 101 shown in FIG. 1 may be received as an audio signal. The speech recognition processing may be performed using a speech recognition server (not shown in the drawings) on so-called cloud computing, or using a speech recognition engine installed onto the terminal 101. The dialogue receiver 202 may receive, as user input information, text that is directly input by the user using a keyboard.

The dialogue information storage 203 stores, as a form of table, dialogue information including a dialogue state indicating a dialogue result between the dialogue system and the user. The table also presents a dialogue history, which is a history of dialogue states, by identifying the dialogue information in a chronological manner. The details of the dialogue information will be described later with reference to FIG. 3.

The target determiner 204 receives input information from the dialogue receiver 202, refers to dialogue information stored in the dialogue information storage 203, and determines a dialogue state as a target dialogue state from the dialogue history, in accordance with an instruction from the user.

The request processor 205 receives the dialogue state and the input information from the target determiner 204, and inputs the dialogue state and the input information to the dialogue processing system, and sends them to the dialogue processing server 102 in FIG. 1 in the example described herein. The request processor 205 acquires a processing result which is a result of dialogue processing at the dialogue processing server 102.

The dialogue information updater 206 acquires an operation target and operation details from the operation receiver 201 and a processing result from the request processor 205, and updates dialogue information stored in the dialogue information storage 203.

The display updater 207 receives the processing result, the operation target, and the operation details from the dialogue information updater 206, and generates update information to update the display of the processing result on the user interface. The user interface is a screen displayed on a display of the terminal 101, for example, and it is updated based on the update information, as needed.

Next, the dialogue information stored in the dialogue information storage 203 will be described with reference to FIG. 3.

In the table 300 shown in FIG. 3, a dialogue state identifier 301, a dialogue sequence identifier 302, a dialogue state name 303, a display status flag 304, a time 305, and system response data 306 are associated each other and stored as dialogue information 307.

The dialogue state identifier 301 is an identifier given to each dialogue state. The dialogue sequence identifier 302 is an identifier given to a group of dialogue states related to each other in terms of a dialogue. It is assumed that a rule of giving the dialogue sequence identifier 302 is predefined by the dialogue processing server 102; however, a rule that is determined on the terminal side may be used. As a predefined rule, for example, the same identifier may be given to a dialogue state included in the same dialogue scenario.

The dialogue state name 303 is a name which is given to a dialogue state managed by the dialogue processing server 102. The display status flag 304 is a flag indicating how a dialogue state is displayed on the user interface of a client (herein, the screen of the terminal 101). In the present embodiment, the display status flag 304 "0" indicates that a processing result is not being displayed, the flag "1" indicates that a processing result is being normally displayed on the user interface, and the flag "2" indicates that a processing result is being displayed in a thumbnail on the user interface. A normal display means a display in a size that can be visually identified when the user considers the details of a processing result. A thumbnail display is a display smaller than the normal display, and it may simply be a display reduced in size, or may only show character strings including search keywords, as long as the user can understand their intended conditions from the display and the display does not interfere with the normal display.

The time 305 is a time when a system response including a processing result is acquired from the dialogue processing server 102. The system response data 306 indicates a body of response data from the dialogue processing server 102 in response to a request from the request processor 205. The response data body includes speech synthesis text, XML of a search result, and data in a JSON format, for example.

Specifically, the dialogue state identifier 301 "1", the dialogue sequence identifier 302 "1", the dialogue state name 303 "Search_spot (Kyoto)", the display status flag 304 "0", the time 305 "2014/07/07 12:05:11" and the system response data 306 are associated with each other and stored as dialogue information 307.

Next, the operation of the dialogue support apparatus 200 in the case of receiving utterances from a user will be explained with reference to the flowchart shown in FIG. 4. Herein, suppose processing of a user's utterance is performed every time.

In step S401, the dialogue receiver 202 receives a user's utterance and generates text as a result of the speech recognition on the utterance.

In step S402, the target determiner 204 specifies an utterance which is a target of a request from the user. In the present embodiment, if the display status flag included in the dialogue information is "1", in other words, the dialogue state which is in a normal display is determined as a dialogue state targeted by the user, then the dialogue state with the display status flag "1" is acquired as a target dialogue state.

In step S403, the request processor 205 sends, as a processing request, text acquired by performing speech recognition on the utterance and the target dialogue state to the dialogue processing server 102.

In step S404, the request processor 205 receives from the dialogue processing server 102 a processing result in response to the processing request.

In step S405, the dialogue information updater 206 updates the dialogue information stored in the dialogue information storage 203 based on the processing result.

In step S406, the display updater 207 generates update information to update the screen based on the updated dialogue information. The operation of the dialogue support apparatus 200 is thus finished.

Figure 5:
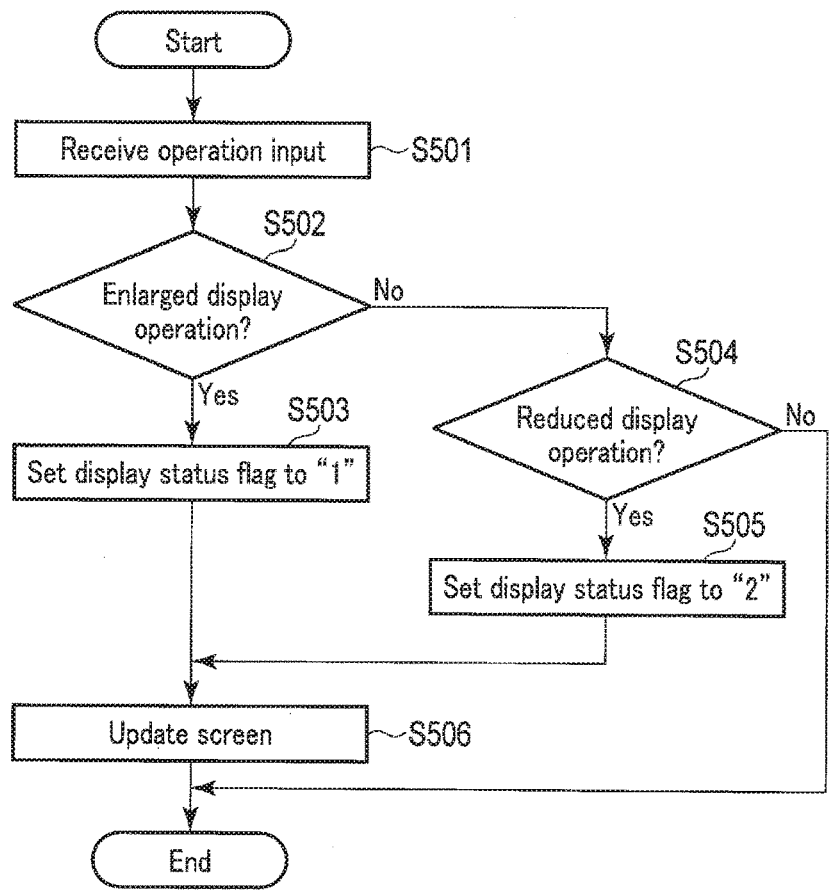
FIG. 5 is a flowchart showing the operation of the dialogue support apparatus when receiving a user's operation.

Next, the operation of the dialogue support apparatus 200 in the case of receiving an operation from a user will be explained with reference to the flowchart shown in FIG. 5. Herein, the processing is performed every time a user's operation is acquired.

In step S501, the operation receiver 201 receives a user's operation and determines a dialogue state which is an operation target.

In step S502, the operation receiver 201 determines, as an operation detail, whether the user's operation is an operation associated with an enlarged display. If the operation is associated with an enlarged display, the process proceeds to step S503; if not, the process proceeds to step S504.

In step S503, the dialogue information updater 206 updates the display status flag to "1" for the dialogue information included in the dialogue state which is an operation target.

In step S504, the operation receiver 201 determines, as an operation detail, whether the user's operation is associated with a reduced display. If the operation is associated with a reduced display, the process proceeds to step S505; if not, the process is finished.

In step S505, the dialogue information updater 206 updates the display status flag to "2" for the dialogue information included in a dialogue state which is an operation target.

In step S506, the display updater 207 generates update information to update a screen based on the updated dialogue information. The operation of the dialogue support apparatus 200 in the case of receiving an operation from the user is thus finished by the above processing.

Next, a specific example of the dialogue support processing in the dialogue support apparatus 200 will be explained with reference to FIG. 6 to FIG. 13.

Figure 6:
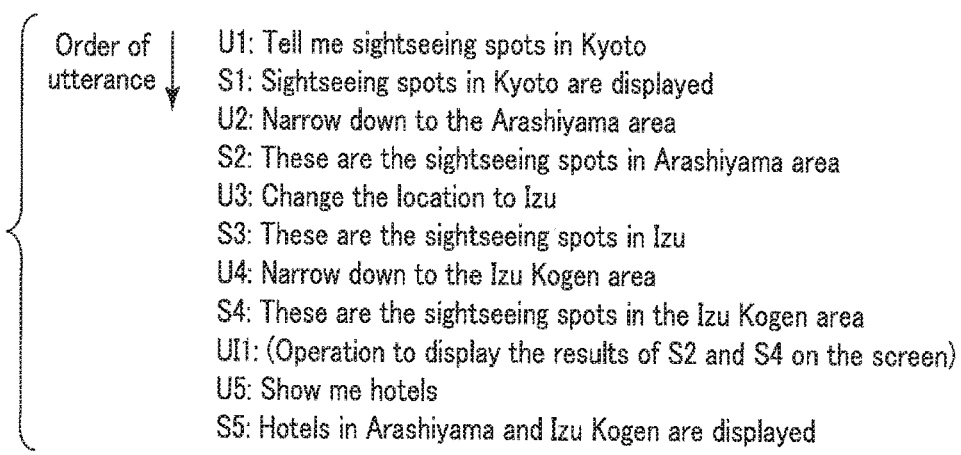
FIG. 6 is a drawing showing a specific example of a dialogue between a user and the dialogue system according to the first embodiment.

FIG. 6 is an example of a dialogue between the user and the dialogue system when the user who has not yet decided any specific details, such as a destination, etc., first searches and compares sightseeing spots in a candidate place, and then searches hotels near the candidate place. The user utterances (U1, U2, . . . ) and the system responses (S1, S2, . . . ) are listed in the chronological order of the utterances. If there is a user's operation which is input to the user interface, it is added as (UI1, . . . ) to the chronological order of the utterances.

In the following, a processing in line with the order of the user's utterances shown in FIG. 6 will be specifically explained.

Figure 7:
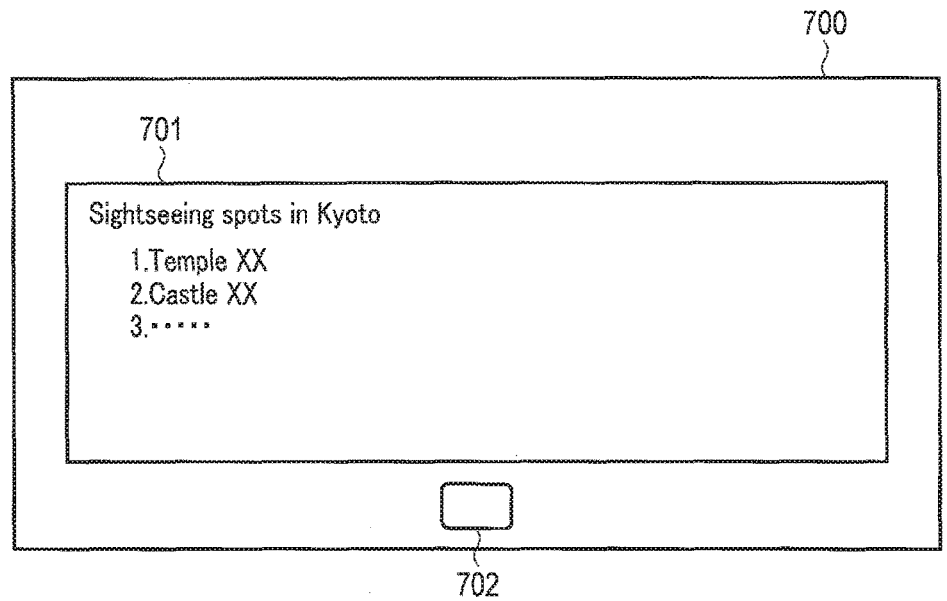
FIG. 7 is a drawing showing an example of a user interface according to the first embodiment.

Herein, an example of the user interface for the user dialogue and operation will be described with reference to FIG. 7.

The user interface 700 displays the display region 701 and the speech recognition button 702. The speech recognition button 702 is a button for a user to notify when to start speech recognition, and the button may be physically pressed, or may be displayed on the screen. Suppose the speech recognition processing begins when the user presses or touches the speech recognition button 702. It may be designed so that the speech recognition begins when the user speaks at a volume louder than a predetermined volume, without a need of pressing the speech recognition button 702.

In the following, suppose the display updater 207 directly updates the user interface based on generated update information.

<Processing of User's Utterance U1>

The user says the user's utterance U1, "Tell me sightseeing spots in Kyoto". The dialogue receiver 202 receives the user's utterance U1 and performs speech recognition, and converts the user's utterance into text. Subsequently, the target determiner 204 refers to the dialogue information and determines whether there are any dialogue statuses displaying a processing result on the user interface 700. At the time of inputting the user's utterance U1, nothing is displayed on the user interface 700, and dialogue information is not stored in the dialogue information storage 203; thus, the target determiner 204 determines a dialogue state as "no target".

The request processor 205 generates a processing request message including information indicating the user utterance U1 and "no target" as a dialogue state, and sends the processing request message to the dialogue processing server 102.

Since there is no dialogue state as a target of the user utterance U1, the dialogue processing server 102 searches for a dialogue scenario that is capable of receiving a user's utterance. Herein, suppose that a sightseeing spots search process has been performed. The dialogue processing server 102 sends a response message including a processing result of the sightseeing spot search process to the request processor 205. The response message includes a dialogue state identifier, a dialogue sequence identifier, a dialogue state name, and a processing time, which are elements of dialogue information, in addition to the text of the user's utterance, and the processing result of the sightseeing spot search process. Herein, since a dialogue state is an initial state, the dialogue state identifier is "1", the dialogue sequence identifier "1", and "the dialogue state name is "Search_spot (Kyoto)".

The request processor 205 receives a response message from the dialogue processing server 102. The dialogue information updater 206 updates dialogue information to be stored in the dialogue information storage 203, using the text of the user's utterance UI included in the response message acquired from the request processor 205, the dialogue state identifier corresponding to the processing result corresponding to the user's utterance U1, the dialogue sequence identifier, and the processing time. Herein, the processing result of the sightseeing spot search process is displayed, and the display status flag is set to "1". In other words, the dialogue state identifier 301 "1", the dialogue sequence identifier 302 "1", the dialogue state name "Search_spot (Kyoto)", the display status flag 304 "1", the time 305 "2014/07/07 12:05:11", and the system response data 306 are associated with each other and stored as dialogue information 307.

The display updater 207 displays the processing result of the user's utterance U1 in a normal manner on the display region 701. Along with the display, the system response S1 from the dialogue system, "Sightseeing spots in Kyoto are displayed" may be output by audio, or may be displayed on a screen. Herein, the processing result at the dialogue system for the user's utterance U1 is displayed on the screen as shown in FIG. 7, and the search result for the sightseeing spots in Kyoto are displayed in a normal manner.

<Processing of User's Utterance U2>

Next, the user speaks a new user's utterance U2, "Narrow down to the Arashiyama area".

The dialogue receiver 202 receives the user's utterance U2 and performs speech recognition, and converts the user's utterance into text. The target determiner 204 refers to the dialogue information stored in the dialogue information storage 203, and determines a dialogue state as a target of the user's utterance U2. The dialogue state to become a target is a dialogue state with the display status flag "1", and herein, the dialogue state with the dialogue state identifier "1" is determined as a target dialogue state.

The request processor 205 generates a processing request message including information indicating the user utterance U2 and the dialogue information in the target dialogue state, and sends the processing request message to the dialogue processing server 102.

In the dialogue processing server 102, an intention of the user's utterance U2 is analyzed and it is determined that the intention is a narrowed-down search request for the target dialogue state. For this determination, a general dialogue scenario determination for an audio dialogue may be used; the detailed explanation of the determination is thus omitted herein. Accordingly, as the user's utterance U2 is in the same utterance group, the dialogue sequence identifier associated with a dialogue state to be newly generated (i.e., a dialogue state identifier "2") is set to "1", which is the same as the dialogue sequence identifier associated with the target dialogue state. The dialogue processing server 102 performs processing (search processing in this example) based on the intention analysis result for the utterance and the dialogue scenario corresponding thereto, and sends a response message including a processing result of the search processing to the request processor 205.

In the same manner as in the case of the user's utterance U1, the dialogue information updater 206 adds and updates the text of the user's utterance U2 and the information related to the processing result for the user's utterance U2 as dialogue information, in accordance with the content of the response message acquired from the request processor 205. In other words, the dialogue state identifier 301 "2", the dialogue sequence identifier 302 "1", the dialogue state name "Search_spot (Arashiyama)", the display status flag 304 "1", the time 305 "2014/07/07 12:05:45", and the system response data 306 are associated with each other and stored as dialogue information 307.

Since the search result displayed in the display region 701 is a processing result for the user's utterance U2, the display status flag 304 associated with the user's utterance U1 is also updated accordingly. In other words, because the dialogue information with the dialogue state identifier 301 "1" will no longer be displayed on the screen, the display status flag 304 is updated from "1" to "0".

Figure 8:
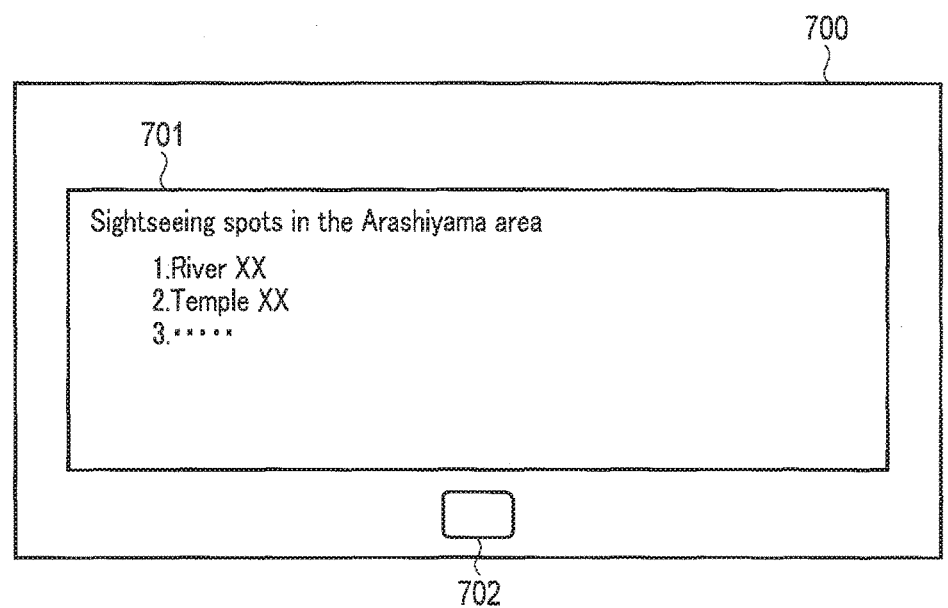
FIG. 8 is a drawing showing a display example of a processing result of a user's utterance U2.

The display updater 207 displays the processing result for the user's utterance U2 in a normal manner. A display example of the processing result for the user's utterance U2 is shown in FIG. 8. The system response S2 "These are sightseeing spots in the Arashiyama area" is output, and the sightseeing spots in the Arashiyama area are displayed in a normal display.

<Processing of User's Utterance U3>

Next, the user speaks a new user's utterance U3 "Change the location to Izu".

The dialogue receiver 202 receives the user's utterance U3 and performs speech recognition, and converts the user's utterance into text. The target determiner 204 refers to dialogue information stored in the dialogue information storage 203, and determines, as a target dialogue state, the dialogue information with the dialogue state identifier "2" associated with the display status flag "1".

The request processor 205 generates a processing request message including information indicating the user utterance U3 and "no target" as a dialogue state, and sends the processing request message to the dialogue processing server 102.

In the dialogue processing server 102, the intention of the user's utterance U3 is analyzed, and the intention is determined as a (new) sightseeing spot search request with a change of location, not a narrowed-down search. A general dialogue scenario determination may be used to make this determination as well. In this case, as the user's utterance U3 is not in the same utterance group, a new dialogue sequence identifier "2" is given to a dialogue state (a dialogue state identifier "3") which is newly generated as a result of processing the user's utterance U3. The dialogue processing server 102 performs processing based on the result of the intention analysis for the utterance and the dialogue scenario, and sends a response message including a processing result of the search process to the request processor 205.

The dialogue information updater 206 adds and updates the text of the user's utterance U3 and the information related to the processing result for the user's utterance U3 as dialogue information, in accordance with the content of the response message acquired from the request processor 205. In other words, the dialogue state identifier 301 "3", the dialogue sequence identifier 302 "2", the dialogue state name "Search_spot (Izu)", the display status flag 304 "1", the time 305 "2014/07/07 12:06:20", and the system response data 306 are associated with each other and stored as dialogue information 307.

At this time, the dialogue information updater 206 determines whether or not the dialogue sequence identifier of the dialogue state currently with the display status flag "1" is the same as the dialogue sequence identifier of the dialogue state which is about to be added. If they are not the same, the current display status flag "1" is changed to "2", and the display status flag of the dialogue state which is newly added is set to "1".

Herein, the dialogue sequence identifier of the dialogue information with the dialogue state identifier "2", which is associated with the display status flag "1", is "1", and the dialogue sequence identifier of the new dialogue state is "2", the display status flag of the dialogue information with the dialogue state identifier "2" is changed from "2" to "1", and the display status flag of the newly-added dialogue state is set to "1".

Figures 9, 10:
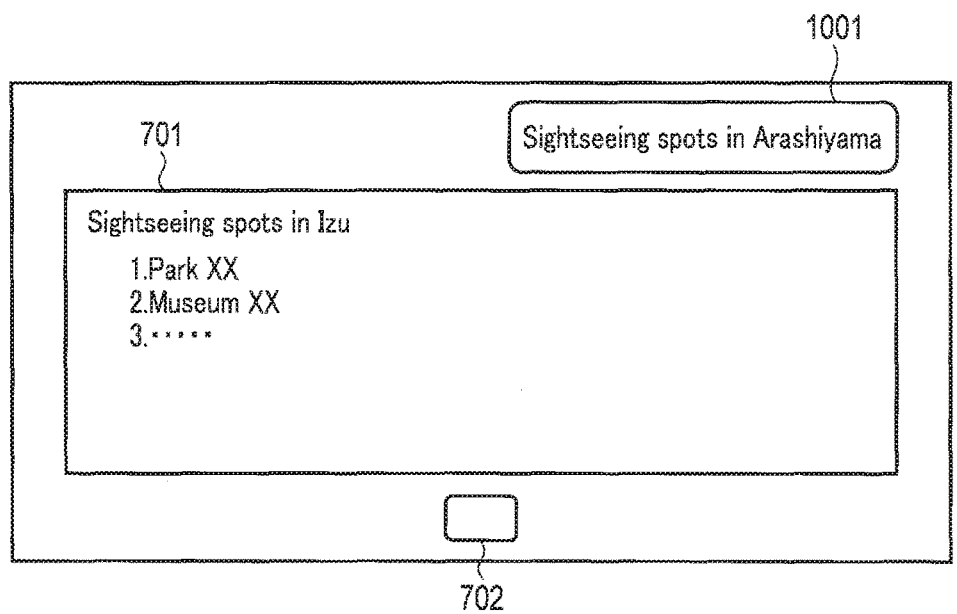
FIG. 9 is a drawing showing a dialogue information table to which dialogue information related to a user's utterance U3 is added.
FIG. 10 is a drawing showing a display example of a processing result of a user's speech U3.

The dialogue information table of the dialogue information storage 203 at the time of adding the dialogue information associated with the user's utterance U3 is shown in FIG. 9.

As shown in the dialogue information 901 in FIG. 9, the display status flag 304 of the dialogue information with the dialogue state identifier 301 "2" is changed to "2", and the display status flag 304 of the dialogue information with the dialogue state identifier 301 "3" is set to "1".

The display updater 207 generates a thumbnail of the search result corresponding to the dialogue state (the dialogue state identifier 2) for which the display status flag has been changed from "1" to "2", and displays the thumbnail.

A display example of the processing result for the user's utterance U3 is shown in FIG. 10.

As shown in FIG. 10, the processing result for the user's utterance U3 is displayed as a normal display in the display region 701, and the system response S3 "These are the sightseeing spots in Izu" is output. The search result display corresponding to the user's utterance U2 is displayed as a thumbnail display in a thumbnail display region 1001 at the top right of the display region 701. A display method is not limited to a thumbnail display, and may be any display method as long as a search result is readily accessible, such as a tab display on the screen.

<Processing of User's Utterance U4>

Next, the user speaks a new user's utterance U4 "Narrow down the location to the Izu Kogen area".

Since the processing for the user's utterance U4 is the same as the processing for the user's utterance U2 and the system response S2, except for the words, the explanation of the process is omitted herein.

<Processing of User's Utterance UI1>

Next, suppose a drag operation on the screen is performed by a user.

For the drag operation herein, an operation of dragging the thumbnail in the thumbnail display region 1001 on the user interface shown in FIG. 10 toward the center of the screen is assumed. If the drag operation is performed, the operation receiver 201 specifies that the operation target is a thumbnail, and generates information indicating that the thumbnail is dragged to or in the proximity of the center of the screen. It is determined that the drag operation is an enlarged display instruction based on the thumbnail and the information indicating that the thumbnail has been dragged. The dialogue information updater 206 updates the display status flag "2" of the dialogue information with the dialogue state identifier "2", with which the display status flag "2" is associated, to the display status flag "1" based on the information from the operation receiver 201. The display updater 207 updates the user interface so as to display the search result of the dialogue information in a thumbnail display in a normal display, side by side with the search result which is currently displayed in the display region 701.

Figures 11, 12:
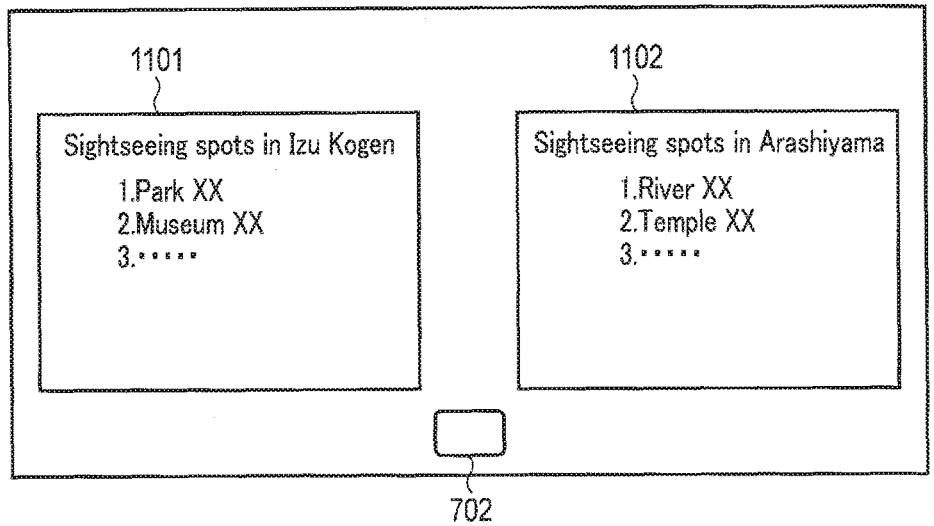
FIG. 11 is a drawing showing a display example in which two search results are displayed side by side.
FIG. 12 is a drawing showing a dialogue information table to which dialogue information related to a user's utterance U5 is added.

The display example in which two search results are displayed side by side is shown in FIG. 11.

As shown in FIG. 11, the search result screen 1101 of "Sightseeing spots in Izu Kogen", and the search result display "1102" of "Sightseeing spots in Arashiyama" which have been in a thumbnail display, are horizontally displayed side by side in the same size. They may also be displayed in a vertical direction. In a case where three or more search results are displayed side by side, such as a case where one search result is displayed and two thumbnails are dragged to the center, the search results may be displayed in a similar manner.

Displaying in such a side-by-side manner makes it easy for a user to compare result screens. If the search results displayed side by side are changed, a search result displayed in the display region 701 can be dragged toward the outside of the user interface. Thus, the operation receiver 201 determines that the drag operation is a reduced display, and the dialogue information updater 206 updates the display status flag "1" of the dialogue information which is a target of the drag operation to "2". The display updater 207 may change the display of the dragged search result to a thumbnail display.

<Processing of User's Utterance D5>

Next, the user speaks a new user's utterance U5, "Show me hotels".

The target determiner 204 refers to dialogue information stored in the dialogue information storage 203, and determines, as a target dialogue state, the dialogue information with the dialogue state identifiers "2" and "4" associated with the display status flag "1".

The request processor 205 generates a processing request message including information indicating the user utterance U5 and dialogue information with the dialogue state identifiers "2" and "4" to the dialogue processing server 102.

In the dialogue processing server 102, an intention of the user's utterance U5 is analyzed and it is determined that the intention of the utterance is a hotel search. The dialogue processing server 102 searches for hotels for each of the dialogue states respectively with the dialogue state identifiers "2" and "4", and sends a response message including a process result of the search processing to the request processor 205.

The dialogue information updater 206 adds and updates the text of the user's utterance U5 and the information related to the processing result for the user's utterance U5 as dialogue information, in accordance with the content of the response message acquired from the request processor 205. In other words, the dialogue state identifier 301 "5", the dialogue sequence identifier 302 "1", the dialogue state name "Search_hotel (Arashiyama)", the display status flag 304 "1", the time 305 "2014/07/07 12:07:50", and the system response data 306 are associated with each other and stored as dialogue information 307, and the dialogue state identifier 301 "6", the dialogue sequence identifier 302 "2", the dialogue state name "Search_hotel (Izu Kogen)", the display status flag 304 "1", the time 305 "2014/07/07 12:07:50", and the system response data 306 are associated with each other and stored as dialogue information 307. The display status flag "1" of the dialogue information with the dialogue state identifier "2" and the display status flag "1" of the dialogue information with the dialogue state identifier "4" are changed to "0".

Herein, the dialogue information table of the dialogue information storage 203 at the time of adding the dialogue information associated with the user's utterance U5 is shown in FIG. 12.

Figures 13, 14:
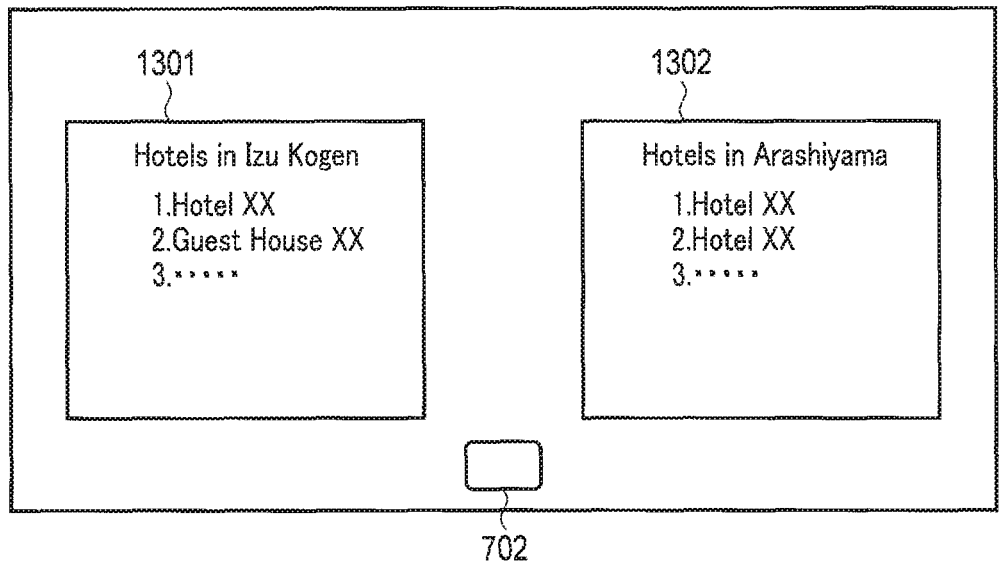
FIG. 13 is a drawing showing a display example of a processing result of a user's utterance U5.
FIG. 14 is a drawing showing a specific example of a dialogue between a user and a dialogue system according to the second embodiment.

Next, the display example of the processing result for the user's utterance U5 is shown in FIG. 13.

As shown in FIG. 13, the search result 1301 for "Hotels in Izu Kogen" and the search result 1302 for "Hotels in Arashiyama" are displayed. Thus, determining the dialogue state in a normal display as a target dialogue state makes it easy to select a dialogue state which the user wants to continue, and the user's inputting an utterance under one condition makes it possible to obtain a processing result for a plurality of dialogue states.

The target determiner 204 determines a dialogue state with the display status flag 304 "1" as a target dialogue state; however, a dialogue state designated by a user touching a dialogue state in a thumbnail display or in a normal display on the screen may be determined as a target dialogue state, regardless of a thumbnail display or a normal display. In this case, a designated flag may be newly set for the dialogue information of the dialogue state selected by a user, and the dialogue state for which the designated flag is set should be sent to the dialogue processing server. A plurality of dialogue states designated by a user's utterance may be determined as target dialogue states. When a target dialogue state is designated by an utterance, a dialogue state in which a match between the text of an utterance obtained by performing speech recognition and a keyword included in a dialogue state name can be found may be determined as a target dialogue state, for example.

According to the foregoing first embodiment, one or more dialogue states for which a user wants to make a request can be easily designated by determining a target dialogue state based on a user's utterance and operation, thereby improving the convenience of an audio dialogue when searching for a program starring an actor whom a user wants to watch, or when comparing and deciding travel destinations, electric home appliances, clothing, and so on at an online store on the Internet. For example, there is no need to input a redundant utterance, as shown below, when searching for a drama:

User: "Show me a drama from yesterday."
System: "There are 10 dramas from yesterday." - - - (1)
User: "How about variety shows?"
System: "There are 25 programs." - - - (2)
User: "Narrow down to a program starring [actor A]."
System: "There are two variety shows starring [actor A] from yesterday." - - - (3)
User: "Search for a drama from yesterday."
System: "There are 10 dramas from yesterday." - - - (4)
User: "Narrow down to a program starring [actor A]."
System: "There is one drama starring [actor A] from yesterday." - - -(5)
(The user looks and compares the result screen (3) and the result screen (5).)
User: "Play XX."

Thus, according to the first embodiment, a smoother dialogue can be supported.

(Second Embodiment)

In the second embodiment, suppose a user corrects content of a previous utterance during an audio dialogue.

As the dialogue support apparatus according to the second embodiment has the same configuration as that of the first embodiment, except for the operation of the request processor 205, the explanation is omitted herein.

The request processor 205 according to the second embodiment operates in almost the same manner as the request processor 205 according to the first embodiment; however, if a user's utterance changes a condition of a dialogue state included in the dialogue history, the request processor 205 according to the second embodiment is different from the request processor 205 according to the first embodiment in respect of acquiring, from the dialogue processing server 102, a dialogue state to which user's utterances after a dialogue state which is a target of change are reflected among the dialogue states included in the dialogue history.

A dialogue example according to the second embodiment is explained with reference to FIG. 14.

FIG. 14 is an example of a dialogue between a user and a dialogue system when a user schedules a recording of a TV program. The user inputs an utterance to request scheduling a recording, and a dialogue is carried out along a dialogue scenario wherein the dialogue system asks the user about a broadcast date, a start time, a broadcast channel, and a program title to specify a program and schedule a recording of the program.

In the following, a processing in line with the order of the user's utterances shown in FIG. 14 will be specifically explained.

<Processing of User's Utterance U10>

The user says the user's utterance U10, "I want to schedule a recording".

At the time of inputting the user's utterance U10, nothing is displayed on the user interface 700, and the same processing as the processing of the user's utterance U10 in the first embodiment is performed; thus, the explanation is omitted herein.

Dialogue information, the dialogue state identifier 301 "10", the dialogue sequence identifier 302 "5", the dialogue state name "Record_TV ( )", the display status flag 304 "1", the time 305 "2014/07/07 12:05:45", and the system response data 306 are associated with each other and stored in the dialogue information storage 203 as dialogue information 307. A result related to the preparation of the scheduled recording processing is displayed in the search result region, and the display status flag is set to "1".

The screen updater 207 displays a processing result related to the preparation of the scheduled recording processing on the display region 701, and outputs a system response S10 from the system, "When is the program broadcast?".

<Processing of User's Utterance U11>

Next, the user speaks a user's utterance U11 "July 10th" as a response to the system response S10, "When is the program broadcast?".

The dialogue receiver 202 receives the user's utterance U11 and performs speech recognition, and converts the user's utterance into text. The target determiner 204 selects a dialogue state with the display status flag "1" as a target dialogue state.

The request processor 205 generates a request message which includes the user's utterance U11 and the dialogue information associated with the dialogue state identifier "10" as the target dialogue state. In the dialogue processing server 102, an intention of the user's utterance U11 is analyzed and it is determined that this utterance is a response to the inquiry from the system in the target dialogue state (the dialogue state identifier "10"). The dialogue processing server 102 sets a dialogue sequence identifier of the newly-generated dialogue state (the dialogue state identifier "11") to be the same as the dialogue information with the dialogue state identifier "10", and sends the dialogue sequence identifier to the request processor 205 as a response message.

The dialogue information updater 206 adds and updates the information related to the processing result for the user's utterance U11 as dialogue information, in accordance with the content of the response message acquired from the request processor 205. In other words, the dialogue state identifier 301 "11", the dialogue sequence identifier 302 "5", the dialogue state name "Record_TV (date: July 10)", the display status flag 304 "1", the time 305 "2014/07/07 12:05:45", and the system response data 306 are associated with each other and stored as dialogue information 307. Since the search result displayed on the user interface is a processing result for the user's utterance U11, the display status flag 304 is also updated accordingly.

The display updater 207 displays the processing result for the user's utterance U11 in a normal manner, and outputs the system response S11, "From what time does it start?".

The user's subsequent utterance U12 "From nine p.m.", the system response S12 "What is the broadcast channel?", the user's utterance U13 "Channel XX", and the system response S13 "What is the program title?" can be processed in a manner similar to the foregoing processing; the explanation is omitted herein.

Next, the dialogue information table of the dialogue information storage 203 at the time of adding the dialogue information associated with the user's utterance U13 is shown in FIG. 15.

As shown in FIG. 15, each dialogue information 307 is stored similar to the dialogue information shown in FIG. 3. As the dialogue proceeds, the dialogue information containing more conditions for recording processing is stored.

Next, the display example of the processing result for the user's utterance U13 is shown in FIG. 16.

As shown in FIG. 16, the broadcast date, the start time, and the broadcast channel are input to schedule a recording of a program.

Herein, suppose the user inputs the user's utterance U14 "Change the broadcast date to July 11th" in response to the system response S13.

The target determiner 204 refers to dialogue information stored in the dialogue information storage 203, and determines, as a target dialogue state, the dialogue information with the dialogue state identifier "13" associated with the display status flag "1".

The request processor 205 generates a request message which includes the user's utterance U14 and the dialogue information of the target dialogue state. In the dialogue processing server 102, an intention of the user's utterance U14 is analyzed and it is determined that this utterance is an utterance to change the broadcast date, not an utterance in response to the system response S13. Thus, the dialogue processing server 102 interrupts the ongoing dialogue of recording scheduling for the broadcast date of July 10, and generates a state of a dialogue of a new recording scheduling for the broadcast date of July 11.

At this time, if the user's utterance which was input before the change of the broadcast date can be utilized in a dialogue after the change, the request processor 205 acquires from the dialogue processing server 102 a dialogue state utilizing the dialogue before the change. In the present embodiment, the first system's utterance after the system's utterance related to the broadcast date is the system response S11 "From what time does it start?".

In response to the system response S11, the user has already answered in the user's utterance U12 "From nine p.m."; accordingly, the user's utterance U12 is utilized. In response to the next system response S12 "Which is the broadcast channel?", the user has also already answered in the user's utterance U13 "Channel XX"; thus, the user's utterance U13 is utilized.

In response to the subsequent system response U13 "What is the program title?", the user has not yet answered; thus, a dialogue state that can be used among the dialogue history can be determined as the user's utterance U12 and the user's utterance U13.

The request processor 205 receives from the dialogue processing server 102 a response message which includes both of a dialogue state up to the change of the broadcast date to July 11, as well as a dialogue state up to the change of the broadcast date to July 11 and the setting of subsequent user utterance U13 "Channel XX".

The dialogue information updater 206 acquires a response message which includes the two dialogue states, and updates the dialogue information.

The dialogue information table of the dialogue information storage 203 at the time of adding the dialogue information associated with the user's utterance U14 is shown in FIG. 17.

Two of dialogue information 1701 and 1702 are recorded as a processing result of the user's utterance U14 "Change the broadcast date to July 11". For the dialogue information 1701, only the broadcast date is changed, and the other user's utterances are not utilized; thus, the dialogue information 1701 is stored as a dialogue state name "Record_TV (date: July )". On the other hand, the dialogue information 1702 is in a dialogue state in which the broadcast date is changed and usable dialogues in the dialogue history are used; thus, the dialogue information 1702 is stored with the dialogue state name "Record_TV (date: July 11/stime: 21:00/channel: Channel XX)". The display status flag "3" indicates a dialogue state is replaceable with the dialogue state currently displayed in the display region 701.

Next, a display example of the user interface when the dialogue information 1701 is displayed is shown in FIG. 18.

In the display region 701 on the user interface, the processing result related to the scheduled recording in which the date is changed to July 11in accordance with the user's utterance is displayed in a normal display, and the system response S11 "From what time does it start?" is output. A dialogue state switching button 1801 is newly displayed at the top right of the screen. The dialogue state switching button 1801 is a button for making a dialogue state corresponding to the dialogue information 1702 sent from the dialogue processing server 102 effective.

Figure 19:
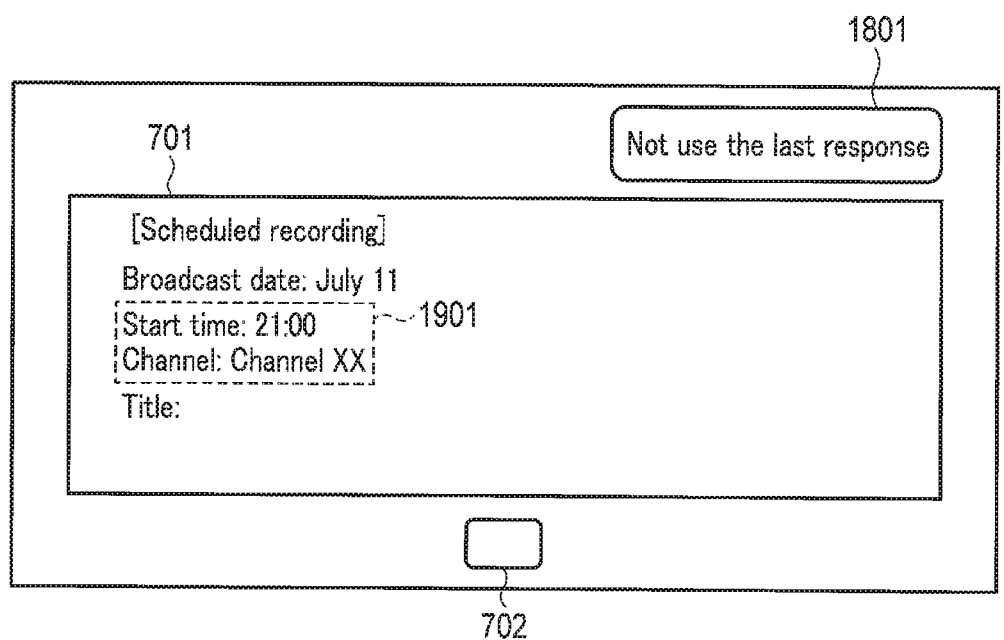
FIG. 19 is a drawing of a display example of the user interface when a dialogue state switching button is pressed down.

Next, a display example of the user interface when the dialogue state switching button 1801 is pressed down is shown in FIG. 19.

As shown in FIG. 19, the change of the broadcast date has been completed, and the state display 1901 in which the dialogue advances to the broadcast date "July 11", the start time "21:00", and the broadcast channel "Channel XX" is displayed. The screen updater 207 may delete the dialogue state switching button 1801 when a user's new utterance is displayed on the screen in the state shown in either FIG. 18 or 19.

According to the foregoing second embodiment, it is possible to select whether or not content of the other utterances can be utilized on the screen based on the dialogue history when content of an utterance is changed during a dialogue, thereby improving convenience of an audio dialogue and supporting a smoother dialogue.

The instructions included in the steps described in the foregoing embodiment can be implemented based on a software program. A general-purpose computer system may store the program beforehand and read the program in order to attain the same advantage as the above-described dialogue support apparatus. The instructions described in the above embodiments are stored in a magnetic disc (flexible disc, hard disc, etc.), an optical disc (CD-ROM, CD-R, CD-RW, DVD-ROM, DV±R, DVD±RW, Blu-ray (registered trademark) disc, etc.), a semiconductor memory, or a similar storage medium, as a program executable by a computer. As long as the storage medium is readable by a computer or by a built-in system, any storage format can be used. An operation similar to the operation of the dialogue support apparatus of the above-described embodiments can be realized if a computer reads a program from the storage medium, and executes the instructions written in the program on the CPU based on the program. The computer may, of course, acquire or read the program by way of a network.

Furthermore, an operating system (OS) working on a computer, database management software, middleware (MW) of a network, etc. may execute a part of processes for realizing the present embodiments based on instructions from a program installed from a storage medium onto a computer and a built-in system.

Furthermore, the storage medium according to the present embodiments is not limited to a medium independent from a system or a built-in system; a storage medium storing or temporarily storing a program downloaded through a LAN or the Internet, etc. is also included as the storage medium according to the present embodiments.

Furthermore, a storage medium is not limited to one; when the process according to the present embodiments is carried out in multiple storage media, these storage media are included as a storage medium according to the present embodiments, and can take any configuration.

The computer or built-in system in the present embodiments are used to execute each process disclosed in the present embodiments based on a program stored in a storage medium, and the computer or built-in system may be an apparatus consisting of a PC or a microcomputer, etc. or a system, etc. in which a plurality of apparatuses are connected through a network.

The computer adopted in the present embodiments is not limited to a PC; it may be a calculation processing apparatus, a processing circuitry, a microcomputer, etc. included in an information processor, and a device and apparatus that can realize the functions disclosed in the present embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A dialogue support apparatus comprising:
   a processing circuitry configured to:
   receive input information indicating a user's intention;
   determine at least one target dialogue state among dialogue histories related to dialogue states indicating dialogue results between a user and a dialogue system which estimates the user's intention and performs processing in accordance with the user's intention, the target dialogue state being a target of instructions from the user;
   acquire a processing result from the dialogue system by inputting the input information and the target dialogue state into the dialogue system; and
   generate first update information to update a display of the processing result; and
   a storage which stores dialogue information which includes an identifier of a dialogue state and a display flag indicating whether the dialogue state is in a normal display or in a thumbnail display,
   wherein the processing circuitry determines a dialogue state for which the display flag indicates the normal display as the target dialogue state.

2. The apparatus according to claim 1, wherein the processing circuitry is further configured to:
   receive an operation of the user on a screen; and
   determine a dialogue state designated by the operation as the target dialogue state.

3. The apparatus according to claim 1, wherein the processing circuitry is further configured to update the dialogue information when the user's operation on the screen is an operation to change a display flag of the dialogue state.

4. The apparatus according to claim 1, wherein
   the dialogue information further includes a dialogue sequence identifier which indicates a group of dialogue states related to a predetermined dialogue in a dialogue scenario, and
   the processing circuitry generates second update information to display a displayed dialogue state in a thumbnail display when a dialogue sequence identifier of the displayed dialogue state is different from a dialogue sequence identifier of a current dialogue state.

5. The apparatus according to claim 1, wherein a current dialogue state is to change a condition of a dialogue state included in the dialogue history, the processing circuitry acquires one or more dialogue states after the dialogue state which is a target of change included in the dialogue history, and
   generates third update information to display the current dialogue state and the one or more dialogue states.

6. The apparatus according to claim 5, wherein the processing circuitry generates fourth update information to display a switch display for a user to select whether or not the one or more dialogue state is displayed in addition to the current dialogue state.

7. The apparatus according to claim 1, wherein the processing circuitry generates fifth update information to display processing results side by side where the processing results are generated respectively to a plurality of dialogue states.

8. The apparatus according to claim 1, wherein the input information is a speech recognition result of utterance of the user.

9. A terminal comprising:
   a speech acquiring unit which acquires a user's utterance to obtain a speech recognition result;
   a communicating unit which sends the speech recognition result to the dialogue support apparatus according to claim 1 to receive a processing result; and
   a display unit which displays the processing result.

10. A dialogue support method comprising:
    receiving input information indicating a user's intention;
    determining at least one target dialogue state among dialogue histories related to dialogue states indicating dialogue results between a user and a dialogue system which estimates the user's intention and performs processing in accordance with the user's intention, the target dialogue state being a target of instructions from the user;
    acquiring a processing result from the dialogue system by inputting the input information and the target dialogue state into the dialogue system;
    generating first update information to update a display of the processing result, and
    storing, in a storage, dialogue information which includes an identifier of a dialogue state and a display flag indicating whether the dialogue state is in a normal display or in a thumbnail display,
    wherein the determining determines a dialogue state for which the display flag indicates the normal display as the target dialogue state.

11. The method according to claim 10, further comprising:
receiving an operation of the user on a screen; and
determining a dialogue state designated by the operation as the target dialogue state.

12. The method according to claim 10, further comprising updating the dialogue information when the user's operation on the screen is an operation to change a display flag of the dialogue state.

13. The method according to claim 10, wherein
the dialogue information further includes a dialogue sequence identifier which indicates a group of dialogue states related to a predetermined dialogue in a dialogue scenario, and
the generating generates second update information to display a displayed dialogue state in a thumbnail display when a dialogue sequence identifier of the displayed dialogue state is different from a dialogue sequence identifier of a current dialogue state.

14. The method according to claim 10, wherein a current dialogue state is to change a condition of a dialogue state included in the dialogue history, the acquiring acquires one or more dialogue states after the dialogue state which is a target of change included in the dialogue history, and
the generating generates third update information to display the current dialogue state and the one or more dialogue states.

15. The method according to claim 14, wherein the generating generates fourth update information to display a switch display for a user to select whether or not the one or more dialogue state is displayed in addition to the current dialogue state.

16. The method according to claim 10, wherein the generating generates fifth update information to display processing results side by side where the processing results are generated respectively to a plurality of dialogue states.

17. The method according to claim 10, wherein the input information is a speech recognition result of utterance of the user.

18. A non-transitory computer readable medium including computer executable instructions, wherein the instructions, when executed by a processor, cause the processor to perform a method that uses utterance intention of a user, the utterance intention being inferred from a first text representing results of speech recognition of user's utterances, the method comprising:
receiving input information indicating a user's intention;
determining at least one target dialogue state among dialogue histories related to dialogue states indicating dialogue results between a user and a dialogue system which estimates the user's intention and performs processing in accordance with the user's intention, the target dialogue state being a target of instructions from the user;
acquiring a processing result from the dialogue system by inputting the input information and the target dialogue state into the dialogue system;
generating first update information to update a display of the processing result, and
storing, in a storage, dialogue information which includes an identifier of a dialogue state and a display flag indicating whether the dialogue state is in a normal display or in a thumbnail display,
wherein the determining determines a dialogue state for which the display flag indicates the normal display as the target dialogue state.

* * * * *